UNITED STATES PATENT OFFICE.

ANTHONY R. SANNA, OF CHEVY CHASE, MARYLAND.

PROCESS OF MAKING ICE CREAM.

1,414,213.   Specification of Letters Patent.   Patented Apr. 25, 1922.

No Drawing. Application filed December 22, 1920, Serial No. 432,604. Renewed November 22, 1921. Serial No. 517,150.

*To all whom it may concern:*

Be it known that ANTHONY R. SANNA, a citizen of the United States, residing at Chevy Chase, in the county of Montgomery and State of Maryland, has invented certain new and useful Improvements in Processes of Making Ice Cream, of which the following is a specification.

This invention relates to improvements in the process of making ice cream particularly with reference to the treatment of the mix.

I employ either skim or whole milk in making up the mix, and so heat it as to destroy the casein fiber, and at the same time bring the albuminoids other than the casein, and the casein into a condition where they will adhere and subsequently precipitate together by the action of the treatment in the next step in the process. The milk is also heated to a sterilizing temperature, this step placing the milk in condition to permit of subsequent pasteurization, even though the same has been treated with special ferments.

After the milk has been thus treated, the temperature is reduced, and the milk is subjected to the action of enzyms to coagulate the mass, and subsequently the mass is agitated to break up the coagulate. A portion of the whey is now drawn off, and the mass is permitted to further cool.

The concentrated milk resulting from the steps in the process may now be used for making ice cream, or other food products, the necessary ingredients being added according to the flavor and the nature of the product desired by the manufacture.

In order to enable others to carry out my improved process, I will now describe the steps in detail.

Skim or whole milk is introduced into a vat and is subjected to a temperature of between 180° and 212° F., which brings the albuminoids, other than the casein, and the casein into a substantially similar condition, so that they will adhere, the high heat employed destroying the fibers of the casein, and at the same time pasteurizing the milk.

Mix produces from milk subjected to this temperature, will be subjected to re-pasteurization when other dairy products are added in the manufacture of ice cream, as will presently appear.

After the desired high temperature is reached, the milk is permitted to cool down to between 80° F., and 110° F., this cooling step being slowly or rapidly effected, depending entirely upon the wishes of the operator. At this low temperature, enzyms, such as pepsin or rennet are added to coagulate the mass, and hold the product in condition for future use.

It may here be stated that the purpose of reducing the temperature at this point, is to create an environment suitable for the enzyms to act, in order that the proper coagulation of the milk may be brought about. As high temperatures kill enzyms, and as it is essential that the casein fibers be destroyed, it follows that to accomplish the contemplated result, high heat must first be resorted to and subsequently low heat obtained, the one acting to pasteurize and prepare the milk for the succeeding step, and both acting to accomplish a unitary result.

The enzyms of course cause the milk to coagulate, the albuminoids, other than the casein, and the casein being precipitated as one in a homogeneous mass, a condition which is to be distinguished from what is ordinarily termed clabber. That is, in the present instance the albuminoids and casein are precipitated as one, while in the other form, as clabber, the albuminoids and casein are precipitated, and the greater portion of the albuminiods remain in suspension. The milk is now allowed to stand until a firm coagulation results, the time usually necessary to accomplish this step being between thirty and forty minutes. Then the mass is vigorously stirred or agitated to break up the coagulate, to separate the casein, albuminoids and fats from the lactos and inorganic salts.

After agitation, the mass is permitted to stand until a firm concentrated coagulate is formed, and the whey is separated, after which a part of the whey is drawn off, the proportion drawn off being determined by the proportions of solids desired in the final product.

While carrying out these steps, substantially the same temperature of the milk is maintained, but after the whey is drawn off, the temperature is further reduced to approximately 38° to 40° F., and the resultant mix is homogenized to thoroughly break up the fat globules and form an emulsion.

The concentrated milk may be preserved for a long period of time, and because of the action of the heat and enzyms, raw dairy products may be added to increase the solids, but the bacteria and other organisms carried in such added products, unless destroyed, would in due time, destroy the mix. It is to permit of the application of the necessary heat to destroy the fermenting life in the milk that the two previously mentioned temperatures are employed.

The process produces a concentrated milk, which contains the albuminoids, casein and fats, the casein fibers however having been mutilated or destroyed, subsequent high heat employed in re-pasteurizing the milk will not harden the casein or curdle the milk. The high heat employed when re-pasteurizing, destroys the previously introduced enzyms and bacteria incident to dairy products, however the enzyms have previously performed their function in the milk in an environment suitable for their cultivation, and the results produced are in no way effected by the subsequent heat. When raw dairy products are added to the concentrated milk, such products contain bacteria which cultivate the enzyms, but this action is destroyed by re-pasteurization, which results in a pure and wholesome mix from which ice cream can be made.

Of course with mix is added such flavor et cetera as may be desirable, and then freezing is resorted to.

What I claim is :—

1. The process of making a food product consisting in heating milk to or within a temperature of 180° to 212° F., to condition the albuminoids other than the casein and the casein to be brought substantially together and at the same time destroy the fibers of the casein, then lowering the temperature to between 80° and 100° and while in this condition adding an enzym to cause coagulation, then breaking up the coagulate and thereafter drawing off a part of the whey.

2. The process of making a food product consisting in heating milk to or within a temperature of 180° to 212° F., to condition the albuminoids other than the casein and the casein to be brought together and at the same time destroy the fibers of the casein, then lowering the temperature to between 80° and 100° F., and while at this temperature adding enzyms to cause the milk to coagulate, thereafter drawing off a part of the whey, then adding butter fat and sugar, and thereafter freezing the mix.

In testimony whereof I affix my signature.

ANTHONY R. SANNA.